United States Patent
Marxer et al.

(10) Patent No.: US 6,530,600 B1
(45) Date of Patent: *Mar. 11, 2003

(54) STEERING-COLUMN CRASH SYSTEM

(75) Inventors: Kurt Marxer, Nendeln (LI); Markus Marxer, Gamprin (LI); Christian Lutz, Nuziders (AT)

(73) Assignee: Krupp Presta AG, Eschen (LI)

( * ) Notice: Subject to any disclaimer, the term of this patent is extended or adjusted under 35 U.S.C. 154(b) by 0 days.

This patent is subject to a terminal disclaimer.

(21) Appl. No.: 09/700,369

(22) PCT Filed: May 17, 1999

(86) PCT No.: PCT/CH99/00208

§ 371 (c)(1), (2), (4) Date: Jan. 8, 2001

(87) PCT Pub. No.: WO99/61297

PCT Pub. Date: Dec. 2, 1999

(30) Foreign Application Priority Data

May 22, 1998 (CH) ................................. 1128/98

(51) Int. Cl.[7] .................................. B62D 1/11
(52) U.S. Cl. ........................................ 280/777; 74/492
(58) Field of Search ........................... 280/775, 777, 280/779; 188/371, 376; 74/492, 493

(56) References Cited

U.S. PATENT DOCUMENTS

| | | | | |
|---|---|---|---|---|
| 4,330,139 A | * | 5/1982 | Katayama | 280/777 |
| 4,892,002 A | * | 1/1990 | Groat | 74/492 |
| 4,943,028 A | * | 7/1990 | Hoffmann et al. | 248/548 |
| 5,348,345 A | * | 9/1994 | Dykema et al. | 280/777 |
| 5,390,955 A | * | 2/1995 | Kaliszewski et al. | 280/777 |
| 5,560,650 A | * | 10/1996 | Woycik et al. | 280/777 |
| 5,669,634 A | * | 9/1997 | Heinzman et al. | 280/777 |
| 5,769,455 A | * | 6/1998 | Duval et al. | 280/777 |
| 5,788,278 A | * | 8/1998 | Thomas et al. | 280/777 |
| 5,820,163 A | * | 10/1998 | Thacker et al. | 280/775 |
| 5,961,146 A | * | 10/1999 | Matsumoto et al. | 280/777 |

FOREIGN PATENT DOCUMENTS

EP   0 289 049   * 11/1998

* cited by examiner

Primary Examiner—Paul N. Dickson
Assistant Examiner—David R. Dunn
(74) Attorney, Agent, or Firm—Notaro & Michalos P.C.

(57) ABSTRACT

The invention relates to a steering device for motor vehicles, comprising a steering shaft that is guided by a guide box (3) which is connected to a retaining console and, for example, clamped. The console has at least one sliding surface (8) along the axis of the shaft (1) which allows for a displacement path (20) with respect to the chassis (18) in the case of a collision. Clamping means (17) are provided for axial retention of the console (6) in an initial position of said displacement path (20). Spacers (26, 27) are provided inbetween the sliding surfaces (8, 12) at a distance from the clamping means (17). When clamping occurs, said spacers cause flexural warping of the retaining device and increase the stability of the device.

14 Claims, 7 Drawing Sheets

STEERING-COLUMN CRASH SYSTEM

FIELD AND BACKGROUND OF THE INVENTION

The invention relates to a steering device for motor vehicles with a steering shaft.

Steering devices for motor vehicles are frequently implemented in two parts, one slidable into the other. In the event of a frontal collision the steering device does not endanger the driver because the steering device yields upon impact of the body onto the steering wheel and the impact energy is absorbed. In known devices, the slidable steering shaft tube, which receives the control wheel-side steering shaft, is disposed in a casing which is clamped with respect to the motor vehicle chassis by machine screw fastening in a predetermined position. The machine screw fastening is herein implemented such that upon impact, the steering wheel side shaft end with an axially directed and machine screwed casing bracket, is movable along a specific path. The impact energy is correspondingly absorbed by the machine screwed clamping. In order to make the energy absorption more uniform in the event of impact, additional energy absorption elements are disposed between the longitudinally slidable shaft and the chassis of the motor vehicle. An energy absorption element, which is implemented as a sheet metal tongue that can be torn away, is, for example, known in the art from GB 1,390,889.

One disadvantage of known crash systems for steering columns is that the break-free force cannot be defined over wide ranges independent of the energy absorption force. Also, the absorption behavior cannot be reproducibly preset.

SUMMARY OF THE INVENTION

The object of the present invention is to provide a crash system for a steering column configuration, which eliminates the disadvantages of the prior art. In particular, the object is to provide a crash system for steering columns which permits a break-free force and a defined energy absorption with reproducible behavior. In addition, the steering column configuration is simply mounted and cost effective.

Accordingly, a steering shaft is supported in a guide box which, in turn, is fixed to a retaining bracket. The retaining bracket comprises laterally flange-like slide faces which are clamped tightly on the motor vehicle chassis via machine screws. The clamping is implemented in such a manner that in the event of a crash, the steering shaft, along with the bracket, can be displaced by several centimeters.

An energy absorption element is stationarily connected to the chassis. The absorption element is preferably a sheet metal part with a tear-away flap, mounted between the bracket flange and the chassis. The attachment of the steering column configuration to the chassis is possible using preferably two machine screws. This provides for a rapid, cost-effective mounting.

The steering column configuration is implemented such that in the event of an impact, the break-free force is separated from the energy absorption force upon sliding of the steering shaft. A clamped break-free element is released immediately to dissipate the impact energy. As a result, the energy absorption over a defined displacement path is not substantially affected by undefined clamping forces and the absorption effect is predetermined through the implementation of the absorption element.

The casing bracket and stationary chassis have facing portions which are pressed together by clamping elements. The facing portions are slightly inclined at a specific wedge angle with respect to a sliding direction. The original clamping is immediately reduced because the two wedge face parts move apart according to the angular slope. In case of an impact the clamping is already broken after a displacement of a few tenths of a millimeter and the further displacement is no longer determined by undefined clamping forces. The casing bracket, which is fixed to the steering shaft tube, is also connected to the chassis via a tearaway strip. The implementation of this tear-away strip determines the degree and the time course of the energy absorption behavior. The energy absorption behavior can be optimized for a more gentle interaction with the driver by adjustment of the dimensions of the tear-away flap.

The invention will be explained in further detail in conjunction with embodiments and accompanying drawings.

BRIEF DESCRIPTION OF THE DRAWINGS

In the drawings:

FIG. 3b is a top view of the clamping configuration in detail according to FIG. 3a;

DESCRIPTION OF THE PREFERRED EMBODIMENTS

The various features of novelty which characterize the invention are pointed out with particularity in the claims and next to and forming a part of this disclosure and are entirely based on the Priority Application No. CH 1128/98

Figure 1A:
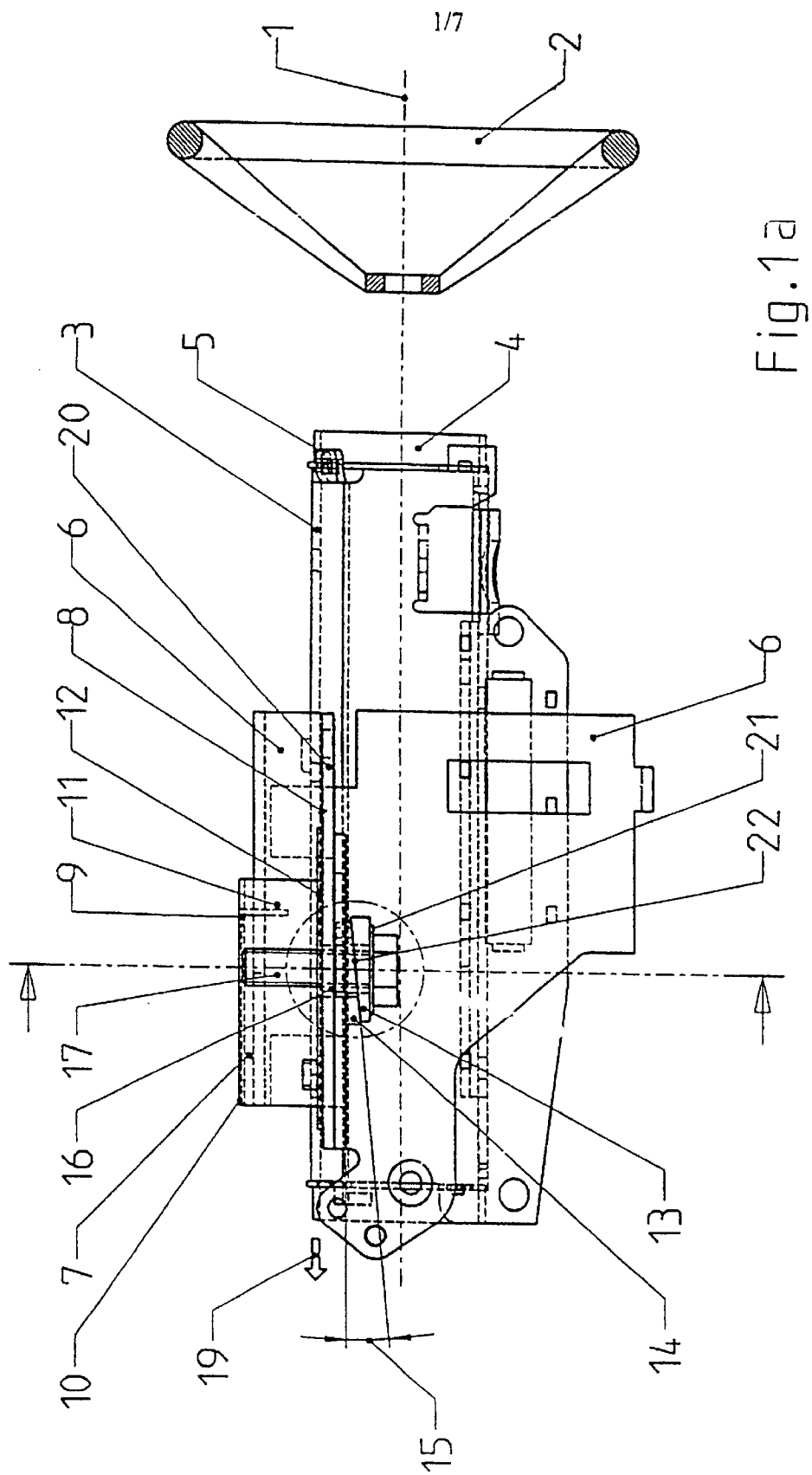
FIG. 1a is a side view of the retaining configuration for steering columns according to the invention.
Figure 1B:
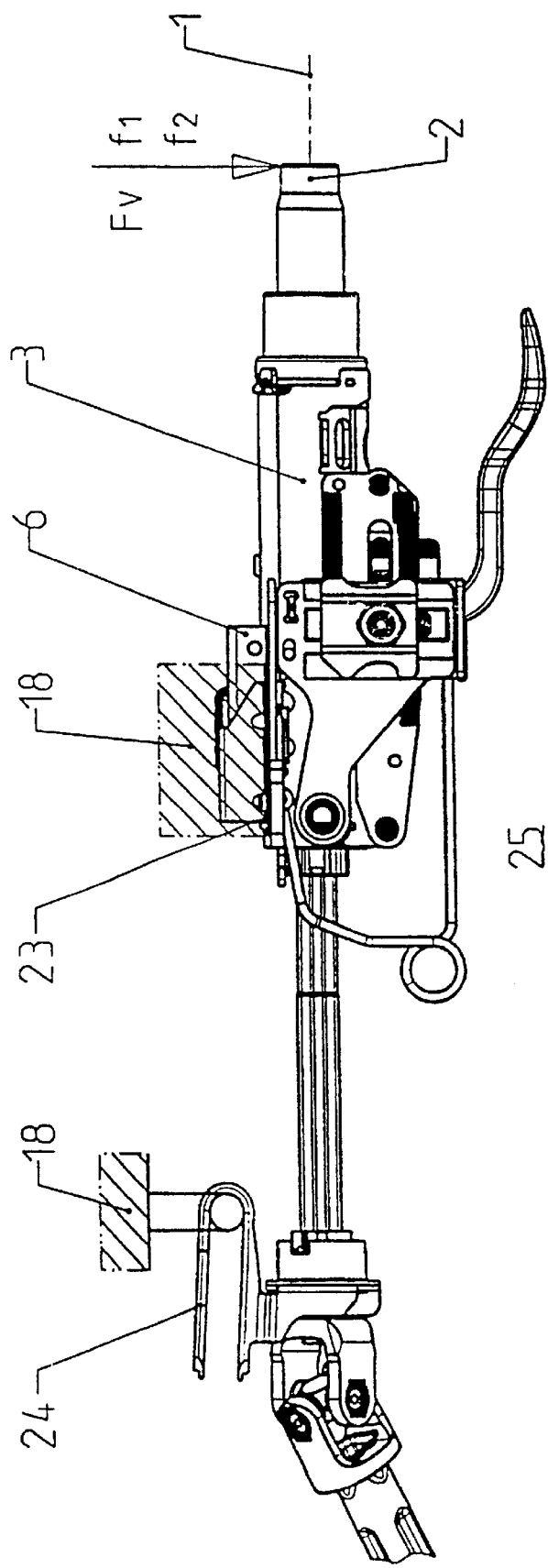
FIG. 1b is a side view of the retaining configuration for steering columns after installation.

A steering shaft schematically illustrated by the steering shaft axis 1 is connected to a steering wheel 2 and supported in a guide box 3, which, as shown in FIG. 1a, is clamped to a retaining bracket 6. The guide box 3 is adjustable in height and length. The bracket 6 is secured to the chassis 18 of the motor vehicle. Shaft 1 is telescopingly slidable in the event of a crash, wherein the bracket 6 is longitudinally movable at a length of up to 50 mm with respect to the chassis 18. The bracket 6 is preferably U-shaped and at least partially encompasses the guide box 3. The bearing guide part 4 is fixed by retainers 5 between the bracket part 6. The sides of bracket 6 have flange-like slide faces 8, which have a longitudinal slot 20. Slot 20 is developed as a running slot and receives the securement elements 13, 16, as well as bolts or preferably clamping machine screws 17.

The bracket 6 is preferably implemented as a sheet metal part because it can be manufactured cost-effectively if it is punched out and integrated as a bent part. There is also the advantage of a greater bending strength not found in welded constructions.

Figure 2A:
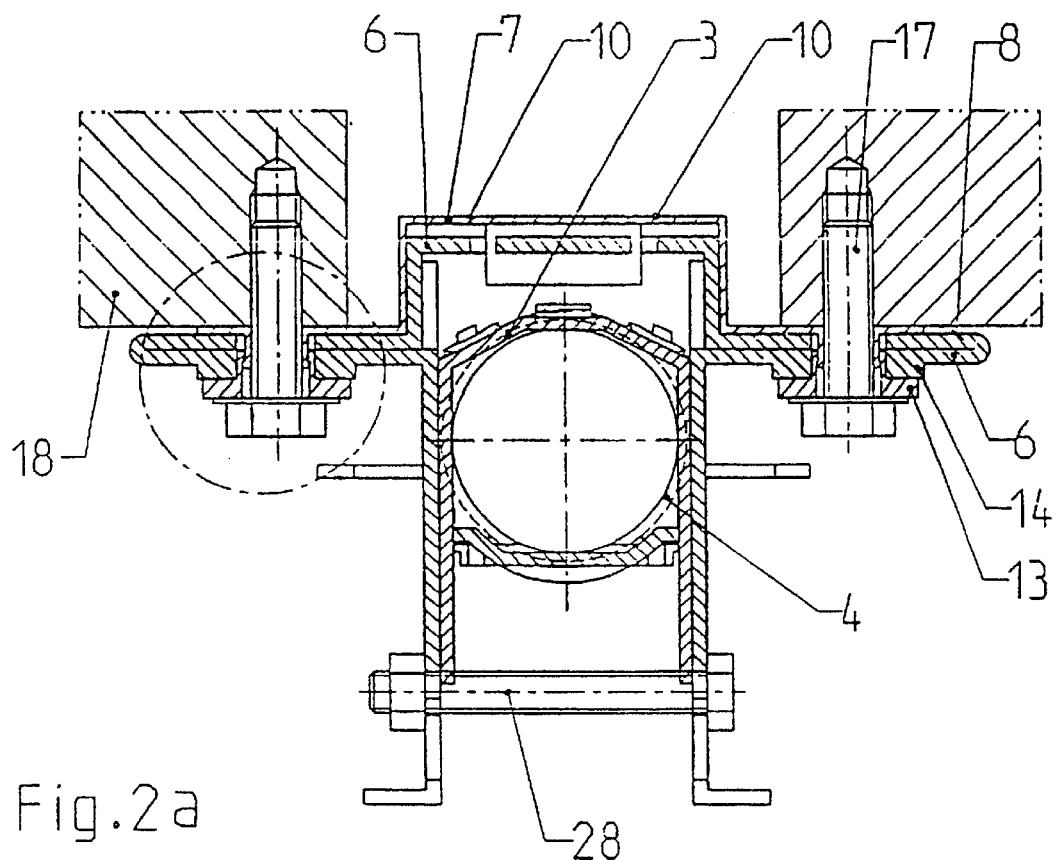
FIG. 2a is a cross section view through the retaining configuration according to FIG. 1.
Figure 2B:
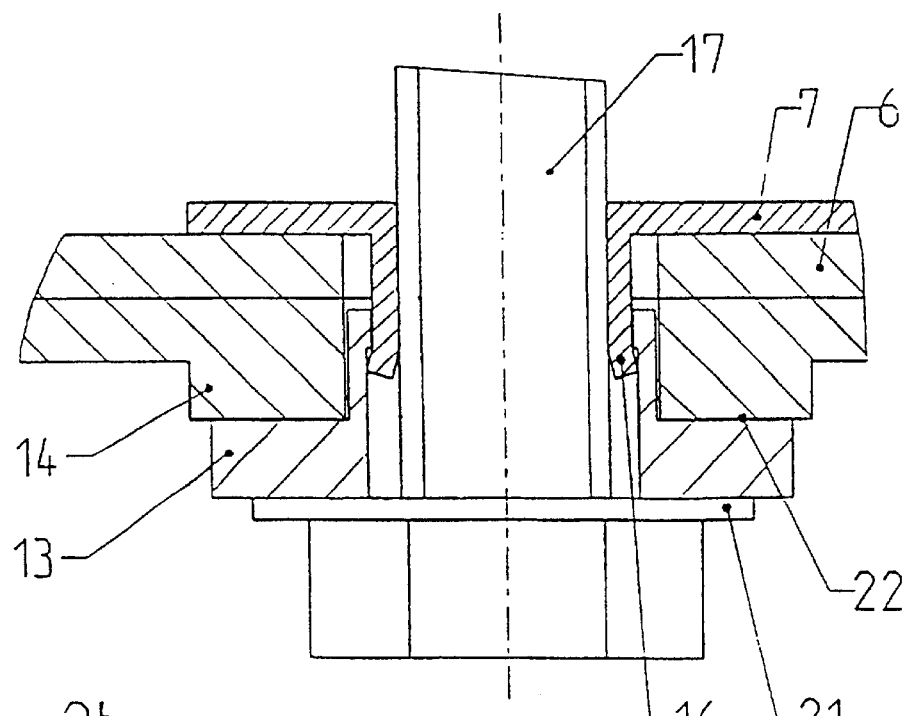
FIG. 2b is a detailed representation of the clamping securement in the cross section.

As shown in FIGS. 2a and 2b, the bracket 6 is screwed tightly to the chassis 18 via clamping machine screws 17, such that in the event of impact the steering shaft with the guide box 3 moves along the length of the slot 20. In order to break free from the clamping, even in short displacement paths, one bracket-side clamping face 22 is implemented as a wedge shoe 14 inclined at a wedge angle 15. The wedge show 14 is slidably mounted in an in the initial clamping position in the terminal region of the running slot 20 during a displacement.

A slide shoe 13 is preferably disposed at the screw head side with a washer disk 21. In FIG. 2a, the disposition is shown in cross section, wherein the preferred manner of securement is depicted on both sides of the shaft axis 1 on chassis 18. The wedge shoe 14 can be integrally formed as part of the bracket 6. The wedge shoe 14 can also be manufactured more simply and precisely as a separate diskform part secured on the bracket 6.

An energy absorption element is preferably in the form of a sheet metal part 7 with a tear-away strip and retaining flap 9. The sheet metal part 7 is preferably developed as a retaining frame 7 which encompasses the U-shaped bracket 6 at its upper region and is stationarily fixed in the initial position by the clamping of the bracket 6 on chassis 18. The tear-away flap 9 is preferably provided in the upper flat metal part of the tear frame 7 and developed in the shape of a U. The tear-away flap 9 is bent as a portion of the tear frame 7 toward the bracket 6 such that the tear-away flap 9 can be clamped or fixed with respect to the bracket. For example, tear-away flap 9 can be clamped or fixed with a welding connection 11. The tear-away strip with retaining flap 9 is disposed between notched or slotted tracks 10 and is set through the material thickness and strength of the tear frame metal and through a rolling rotational width with a corresponding rolling radius. It is possible to vary the absorption force profile over the path by varying the rolling width.

Elevations 26,27 (shown in FIG. 3a) are provided between the slide face of the chassis 8 and the slide face of the tear frame 7. These faces are kept apart at a spacing and can be compressed in the clamping region, which causes the elastic flexural tensioning of the parts. This flexural tensioning significantly increases the stability of the configuration. Thereby, a material-saving and lesser-dimensioned construction is possible. The elevations 26,27 can be provided on one side either at the bracket side or the tear frame side or also as an insert. They must have such spacing with respect to the clamping securement 17 that a resilient tensioning is possible. The elevations 26, 27 can be implemented, for example, in the form of knubs. The method of flexural tensioning can also be advantageously used in configurations without the previously stated break-free elements 22, 26, 27. But a combination makes possible the especially economic realization.

The tear frame 7 is clamped with the slide faces 12 which are clamped between the slide face 8 of the bracket 6 and the chassis 18. This clamping configuration has advantages even when the other special break-free elements 13, 14, 22 are not used. It permits simple mounting with cost-effective implementation, good operational behavior, and high configuration stability. These advantages are particularly demonstrated by the securement achieved with only two machine screws 17. The configuration according to the invention can be realized without a separate bracket guidance, which simplifies the structure considerably.

Figure 3A:
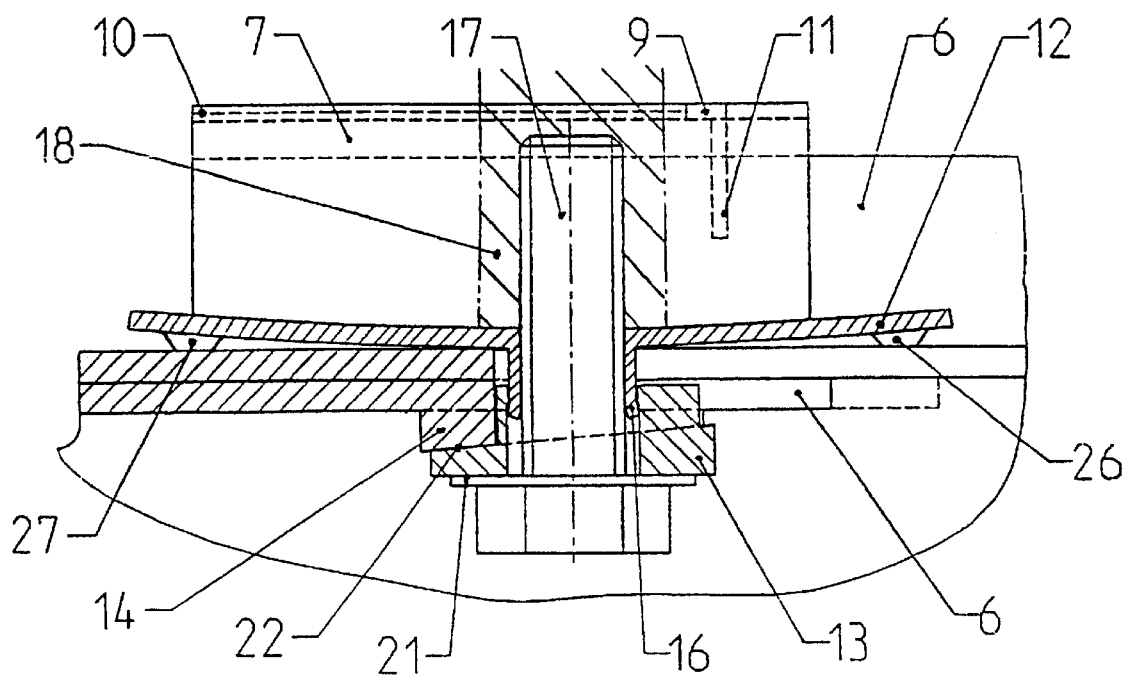
FIG. 3a is a detailed representation of a flexurally tensioned clamping face configuration in longitudinal section with inclined clamping faces.

As shown in FIG. 3a, the slide shoe 13 is implemented such that a portion of it can slide torsion-tightly in the running slot 20 during the displacement of the bracket 6 relative to the slide shoe 13. After the wedge faces 22 between the wedge shoe 14 and the slide shoe 13 move apart and the clamping is broken free, the retaining force or the energy absorption is determined by the tear-away strip. Since the clamping faces with respect to the clamping direction are not disposed at a 90° angle, an immediate breaking free of the clamping force is possible through short displacement paths. Suitable wedge angles range from 2° to 15°, but they should preferably range from 3° to 8°.

Figure 3B:
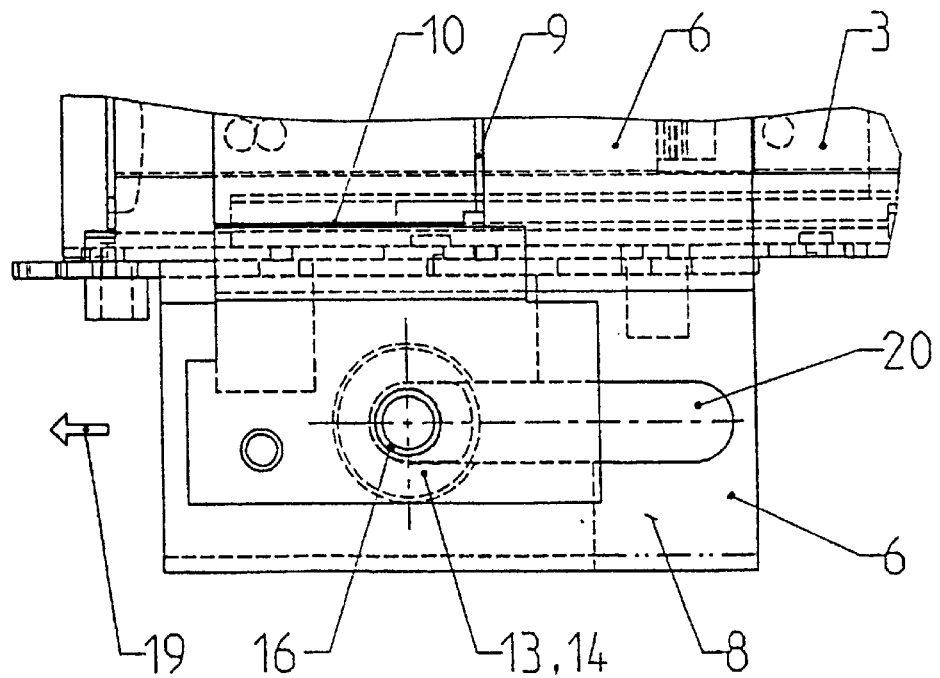

The tear frame 7 is implemented on both sides of the securement region as a sheet metal tongue, which is disposed between the chassis 18 and the slide flange face 8 of the bracket 6, and is also clamped relative to the chassis 18 by machine screw fastening 17. In the event of impact, the bracket 6 and the wedge show 14 are displaced maximally corresponding to the running slot length 20. The wedge show 14 consequently moves away from the stationary slide shoe 13. The tear frame 7 remains stationary and the tear-away flap 9, which is fixed on a bracket part 6, is torn away. In order to establish a connection which is free of undesirable movement between slide shoe 13 and the tear frame 7, the bore in the tear frame 7 is preferably provided with a crimping 16 so that the slide shoe 13 is guided together with the crimping 16 as depicted in FIG. 2b. This configuration is shown in top view in FIG. 3b, where the running slot 20 is also shown.

A further improvement of the reproducibility of the break-free behavior can be attained by the surface treatment of clamping faces 22. The surfaces can be roughened and/or coated and/or lubricated.

Figure 4:
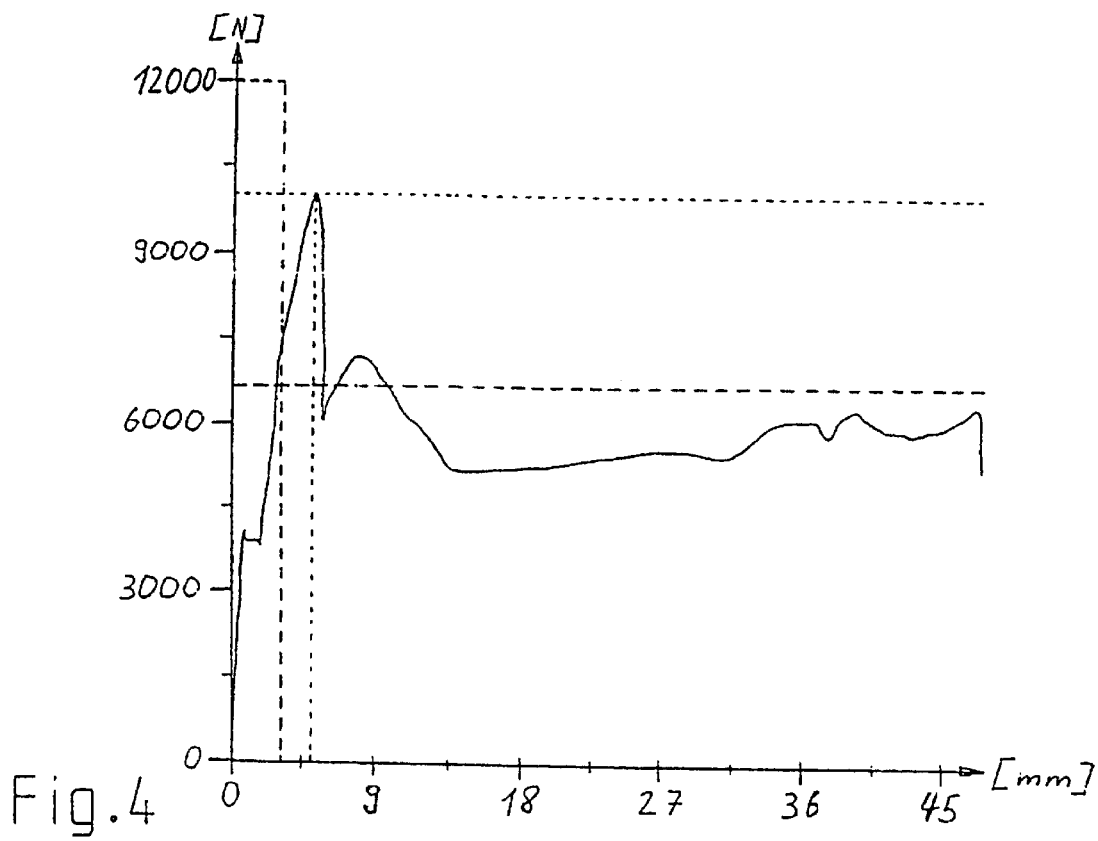
FIG. 4 is a crash force measurement diagram which shows the behavior according to the prior art.
Figure 5:
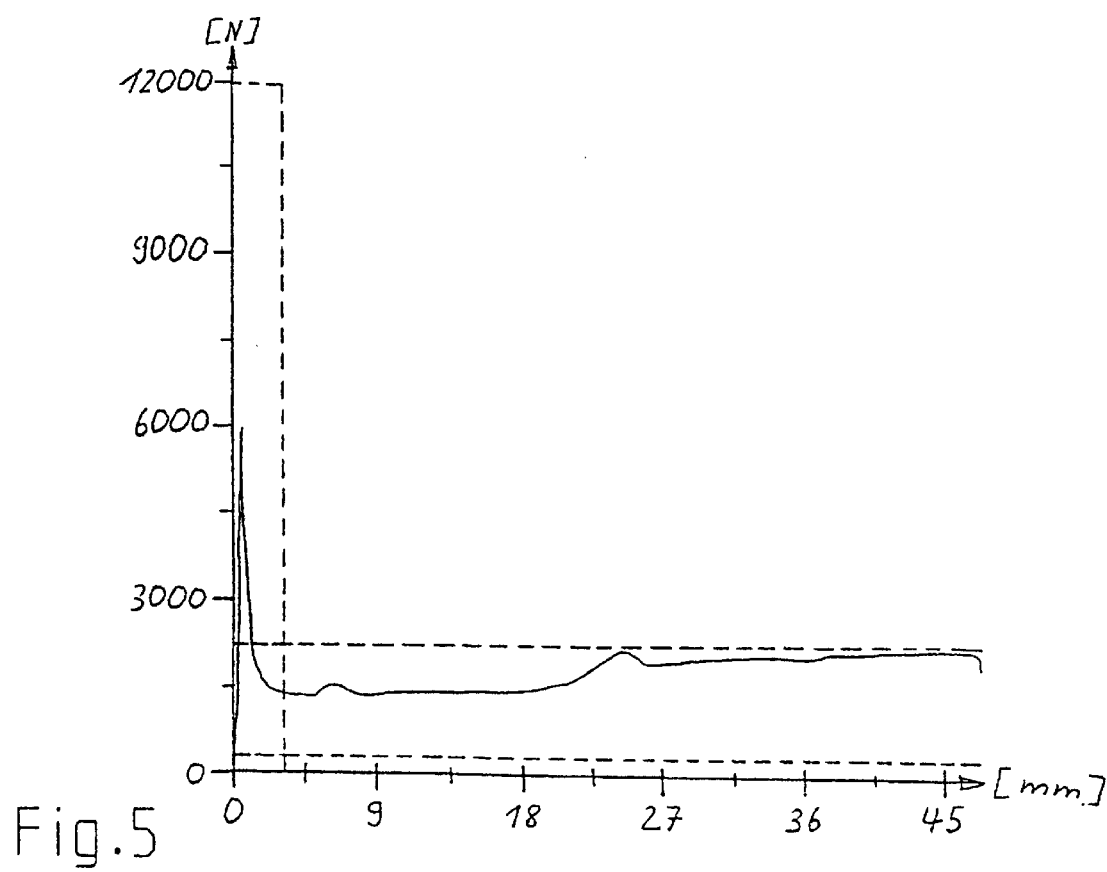
FIG. 5 is a crash force measurement diagram which shows the behavior according to the invention.

The tightening torque of the clamping screws 17 is preferably set with torsional moment in the range from 15 to 35 Nm. In FIG. 4, according to the break-free diagram, the measured behavior of the break-free force is shown over a path of 45 mm, wherein the machine screw fastening takes place with a torsional moment of 25 Nm. This demonstrates that the break-free force was above 9000 N and decreases only after a relatively long path of approximately 5 mm. A relatively high residual clamping force effect of approximately 6000 N remains indeterminately until the path of 45 mm has been completed. FIG. 5 shows the behavior of the break-free force that results from a configuration of the present invention, under the same measuring conditions used in FIG. 4. The machine screw fastening is set with 25 Nm torsional moment. The break-free force reaches 6000 N and immediately decreases steeply and definitively after a path of 1 mm. Thereafter, the break-force remains on a low level with break-free elements with inclined faces below 2000 N uniformly over the entire path of 45 mm. After the short break-free occurrence, the absorption energy is determined and defined, and it is reproducible and presettable through the absorption element. For example, a tear-away flap may be preset with energy absorption forces of 1200 to 5500 N.

Figure 6:
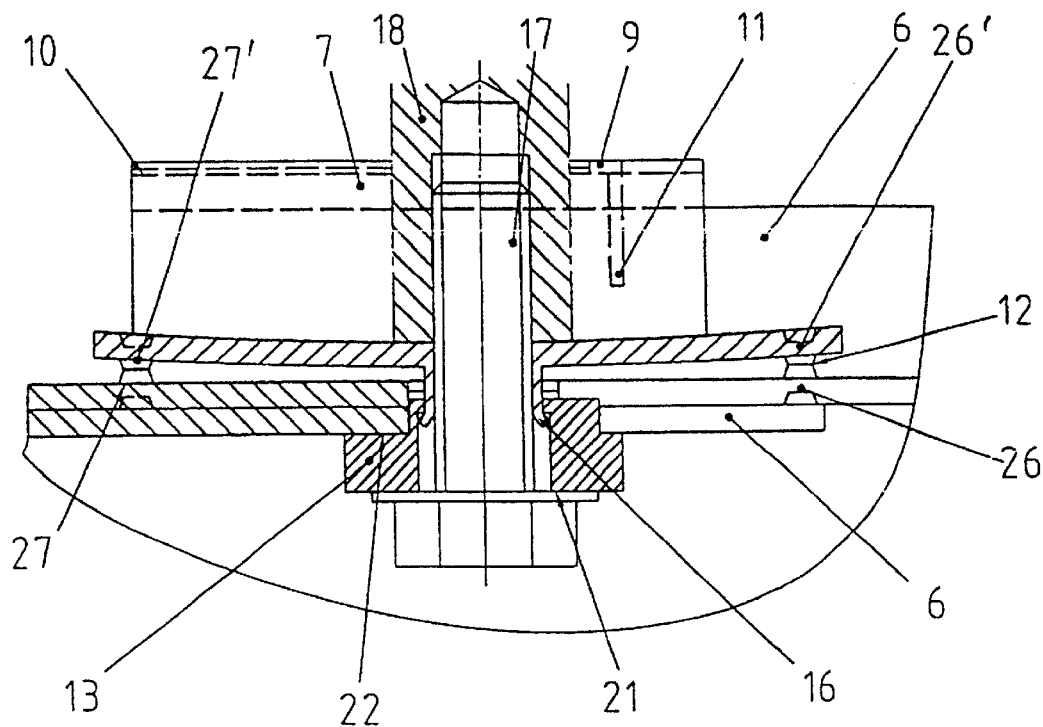
FIG. 6 is a detailed representation of a further flexurally tensioned clamping facing configuration in longitudinal section with elevations as spacer elements between the slide faces.

Another embodiment of a break-free element is shown in FIG. 6, and comprises disposing elevations 26, 27 disposed between the slide faces 8, 12. The elevations 26, 27 retain the slide faces 8/12 in an initial position at a slight distance of a few tenths of a millimeter up to approximately 3 mm. The elevations 26, 27 are to be disposed symmetrically on both sides of the slide faces such that where the elevations are clamped onto one another, slide faces 12 slide off one another in the event of a displacement event such as a crash, thus reducing the clamping force effect in a short distance in the mm range. Subsequently, the energy absorption is assumed definitively by the absorption elements, tear frame 7, tear-away flap 9, and welding connection 11. Such elevations can be developed, for example, in the manner of knubs and can be disposed on both sides in the longitudinal direction of the shaft axis of the screw securement 17. But it is also possible to dispose several knub-like elevations adjacently or successively to one another or in a stair-stepped or inclined plane configuration, depending on the requirement of the clamping forces, the friction forces and the display paths, or the dimensioning of the entire configuration. In the present case the slide shoe 13 can be in the form of a simple shim. It is also possible to provide these knub-like formations in the region of the slide shoe 13.

Figure 7:
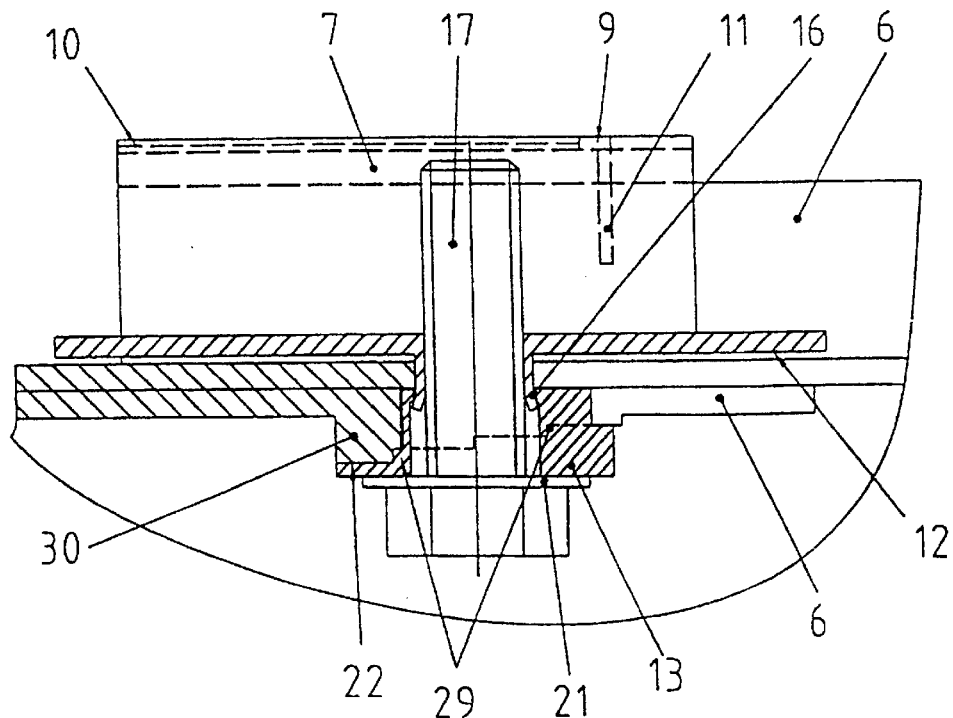
FIG. 7 is a detailed representation of another clamping facing configuration in longitudinal section with stair-stepping in the clamping region.

FIG. 7 illustrates another preferred embodiment of a break-free element. The contacting clamped faces of the slide shoe 13 and of the original wedge shoe 14 interposing step. The width of the stepped clamping face defines the break-free path. This embodiment is especially simple and cost-effective. The above listed various types of the break-free elements can also be used in combination with one another. This configuration can also be combined with spacer elements 26,27 for flexural tensioning.

To increase the flexural stiffness of the configuration, the invention proposes that in the region of the clamping means additional means, preferably elevations, are provided which make possible the tensioning of th retention in the spring-elastic region. This flexural tensioning of the configuration permits accepting greater loading with lower degrees of deformation even if the bracket configuration is produced, for example, as a simple sheet metal construction by, for example, stamping and bending. This flexural tensioning of the bracket configuration with the absorption element also permits the simple attachment with satisfactory stability with, for example, only two machine screws which are each attached on one side of the bracket.

This flexural tensioning is made possible thereby that, for example, between the slide faces, spaced apart from the clamping securement, spacer elements are provided which with the clamping securement causes the flexural tensioning. Such elevations can be a few tenths of a millimeter up to a few millimeter. These can be provided in the direction of the shaft axis or also laterally of the securement elements.

In a further advantageous embodiment, the configuration is implemented such that the break-free force is decoupled from the energy absorption force upon sliding of the steering shaft.

Due to a flexurally tensioned retaining configuration, the steering column 25 can absorb greater forces $F_v$, or the traverse deflection $f_1$, $f_2$ is less with corresponding action of force onto the control wheel 1. In FIG. 1a, a steering column configuration 25 for the corresponding measurement structure is shown. The steering column 25 is herein secured on two sites 23, 24 on the chassis 18.

Figure 8:
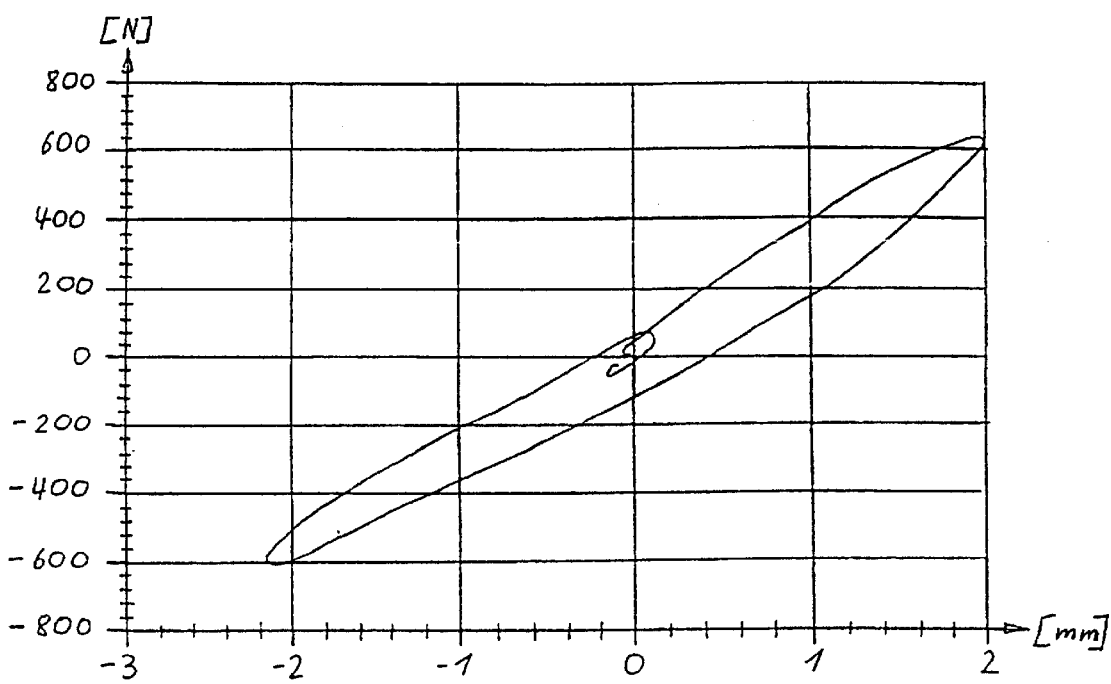
FIG. 8 is a rectification test measurement diagram which has the information behavior according to the prior art.
Figure 9:
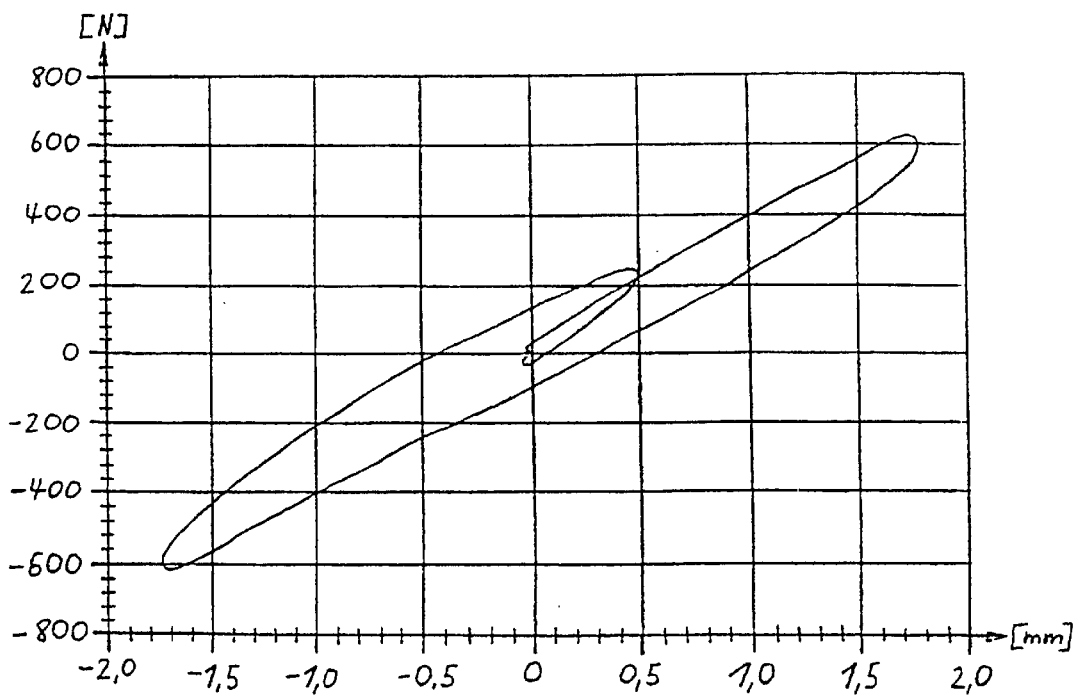
FIG. 9 is a rectification test measurement diagram which shows the behavior with a flexurally tensioned retaining configuration.

In the case of a vertical force action $F_v$ of 500 N on the shaft at control wheel 2, with the rectification test, in the implementation according to prior art, deflections $f_1$,$f_2$ of ±2 mm are measured as is shown in the diagram in FIG. 8. In a retaining configuration according to the invention, with flexural tensioning even with sheet metal constructions, under identical measuring conditions, deflection values of less than ±2 mm ca readily be achieved, which corresponds to the severe specifications required today. FIG. 9 shows deflection values of less than ±1.8 mm, under the same action of force and the embodiment according to the invention with flexural tensioning.

What is claimed is:

1. A steering device for motor vehicles having a chassis, the steering device comprising:

a steering shaft;

means for supporting the steering shaft;

a bracket connected to the supporting means, the bracket having at least one slide face;

means for clamping the bracket to the chassis in an initial position, wherein the slide face overlaps the chassis;

means for guiding the bracket from the initial position to a displaced position;

means for prestressing the bracket;

an energy absorber fixed to the chassis and detachably connected to the bracket, whereby in the event of a break-free force, the bracket breaks free from the energy absorber.

2. A device as claimed in claim 1, wherein, in at least one subregion of the initial position, the clamping means comprise a break-free element with a clamping facing such that with a displacement of the bracket in the shaft axis direction the clamping force is reduced.

3. A steering device as claimed in claim 1, wherein the means for supporting the shaft is a guide box.

4. A steering device as claimed in claim 1, wherein the prestressing means comprises a spacer located between the retaining bracket and an opposing face of the energy absorber.

5. The steering device as claimed in claim 4, wherein the spacer is implemented as an elevation.

6. The steering device as claimed in claim 4, wherein the spacer is provided in a direction of a shaft axis.

7. A steering device as claimed in claim 1, wherein the clamping means comprises a machine screw.

8. A steering device as claimed in claim 7, wherein the machine screw has a tightening torque of about 20 to 30 Nm.

9. A steering device as claimed in claim 1, wherein the guiding means comprises a slot having a displacement length formed on the slide face of the bracket, the slot receives the clamping means.

10. A steering device as claimed in claim 9, wherein the displacement length of the slot is 50 mm.

11. A steering device as claimed in claim 1, wherein the energy absorber is a tear frame mounted between the bracket and the chassis.

12. A steering device as claimed in claim 11, wherein the tear frame comprises a U-shape having a break-away element connected to the bracket.

13. A steering device as claimed in claim 1, wherein the bracket has a U-shaped body having a closed top end and an open body end, the slide face extends perpendicular from the U-shaped body adjacent the closed top end.

14. The steering device as claimed in claim 1, wherein the bracket is a sheet metal part.

* * * * *